3,560,241

METHOD OF METALLIZING A POLYSULFONE BODY

Kenneth C. Davis, Endwell, and Glenn V. Elmore, Vestal, N.Y., assignors to International Business Machines Corporation, Armonk, N.Y.

No Drawing. Filed Mar. 6, 1968, Ser. No. 710,733
Int. Cl. B44d *1/092*
U.S. Cl. 117—47 5 Claims

ABSTRACT OF THE DISCLOSURE

A plastic body is metallized by treating it with a solvent for the specific plastic material, followed by treatment in a second solvent which is miscible with the first solvent but is a nonsolvent for the specific material. The solvent treated material is sequentially treated in an acid conditioner, an alkaline cleaning solution, and neutralized in a dilute hydrochloric acid solution prior to metallization. Each step may be preceded by a rinsing step. The method of the invention provides firmly bonded metal films to polysulfone substrates. The bonded material has peel strengths of about 9 pounds per inch. The method of the invention as described herein is applicable to the manufacture of additive printed circuits.

BACKGROUND OF THE INVENTION

Field of the invention

This invention relates to a method of bonding a metal to a plastic material; more specifically, it relates to a method of bonding a metal to a polysulfone material in which the polysulfone material is sequentially treated in a solvent, a nonsolvent, and is acid conditioned, alkaline cleansed, sensitized and metallized.

DESCRIPTION OF THE PRIOR ART

There have been many methods disclosed in the prior art for bonding metal to plastic bodies. Several of these methods are disclosed and discussed in U.S. Pat. No. 3,267,007. While these methods have been found suitable for ABS plastic materials and the like, they have been found unsuitable for bonding metals to the surface of polysulfone materials.

Polysulfones, (linear polymers prepared from sulfur dioxide and an olefinic compound, e.g., 1-butene, and having the repeating structure

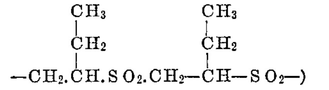

because of their excellent heat stability, have recently found favor for use in printed circuit boards. Until recently, however, little use was made of these materials, because only with extreme difficulty has one been able to bond metal films to polysulfone surfaces. For example, when the methods of bonding of the prior art are used to bond metals to polysulfone bodies, peel strengths of only 2 pounds per inch or less are obtainable.

SUMMARY OF THE INVENTION

According to an aspect of the invention, there is provided a method of bonding a metal to the surface of a plastic body. The plastic body is treated with a first solvent therefor to provide a surface coating of the plastic dissolved in the solvent and thus treating the same surface with a second solvent which is miscible with the first solvent but which is a nonsolvent for the plastic. The plastic surface is thuly made well receptive to a metal coating. Additionally, the steps of acid conditioning of the plastic surface, alkaline cleansing, sensitization and metallization are subsequently performed. The method of this invention provides relatively strong bonding of metals to plastic surfaces. Specifically, when metals are bonded to polysulfone surfaces, bonding strengths of the order of 9 pounds per inch are obtained when measured by the 90-degree peel test.

Accordingly, it is an object of the invention to provide an improved method of bonding a metal to the surface of a plastic body.

A more specific object of the invention is to provide an improved method for bonding a metal to the surface of polysulfone bodies.

DESCRIPTION OF THE PREFERRED EMBODIMENTS

According to a more specific aspect of the invention, a method is provided for bonding a metal to a plastic body.

The plastic body is treated for about 2 to 60 seconds in a first solvent which dissolves a thin layer of the surface of the plastic body. The body is then treated, for about 2 to 60 seconds, in a second solvent which is miscible with the first solvent but is a nonsolvent for the specific body, which solvent causes the deposition of the plastic dissolved in the first solvent as a matt on the surface of the plastic body. After the solvent treatment steps, the body is air dried for a period of about 30 minutes to remove the solvents. Subsequent to air drying, the body is treated with an acid conditioner, i.e., a solution containing principally chromic and sulfuric acids. Acid conditioning of the body is maintained for a period of from 15 minutes to 60 minutes at temperatures in the range of 150° F. to 190° F., depending on the time the body is maintained in the acid solution. Acid conditioning serves to etch the surface of the deposited matt to render the same water wettable. The acid is removed from the body's surface by treating the same in an alkaline solution, such as Pennsalt K–2 alkaline cleaner, a mixture of $NaCO_3$, $Na_3PO_4$ and NaOH, prepared by the Pennsalt Chemical Company. While this particular alkaline mixture has been found to be of value, other alkaline solutions may be used as well. Neutralization of the matt surface is followed by treating it in a dilute hydrochloric acid bath, containing 1 part hydrochloric acid to 2 parts water. After rinsing the above treated plastic body, it is ready to be metallized. Metallization may be accomplished by any of the methods well known in the art. For the purposes of this invention the plastic body is sensitized in stannous chloride and palladium chloride solution and a metal is electrolessly deposited. The metal deposit may be increased in thickness by subsequently electrodepositing the same or different metal to the already metallized surface.

The invention is further illustrated by the following preferred embodiment. While the preferred embodiment to follow is directed to the metallization of polysulfone bodies, it is given by way of example and not by limitation. Other well-known thermoplastic and thermosetting materials such as polyvinyl compositions, polyester, polyphenols and the like may be treated in similar manner. The choice of solvents and nonsolvents for the above materials would be within the ken of one skilled in the art.

A polysulfone body, prepared from sulfur dioxide and 1-butene, is immersed in a chlorinated hydrocarbon, for example, methylene chloride, for about 30 seconds. The polysulfone body is then removed from the methylene chloride and is immersed in a ketone solvent, e.g., acetone, methyl ethyl ketone and the like, for another 30 seconds. Upon removal from the ketone solvent, the polysulfone body is allowed to dry in air for about 30 minutes. The polysulfone body is then etched in an acid conditioner, such as Enthone 470 and 472, (chromic and sulfuric acid compositions manufactured by the Enthone Corp.) for 30 minutes at 190° F. Following acid conditioning, the polysulfone body is washed thoroughly in water and immersed in an alkaline solution. The solution is comprised of 8 ounces of the Pennsalt K–2 alkaline cleaner per gallon of water. The polysulfone body is allowed to remain in the alkaline cleaner solution, which is maintained at a temperature of about 140° F., for about 5 minutes. After removal from the alkaline solution, the polysulfone body is rinsed in water and immersed in a dilute hydrochloric acid solution, comprising 1 part acid and 2 parts water, for one minute and is again rinsed in water. The so treated polysulfone body is now metallized. For the purposes of this invention the above treated polysulfone body is sensitized in standard stannous chloride and palladium chloride solutions and immersed in an electroless plating bath containing a desired metal to be plated. Following the electroless deposition, the deposited metal film is thickened by a standard electrodeposition of the metal.

Metal films deposited on polysulfone bodies according to the above method have been tested for peel strength using the known 90-degree peel test. Peel strengths on the order of 9 pounds per inch have been obtained for metal plated polysulfone bodies of this invention. Attempts to metal plate polysulfone bodies by the methods of the prior art, when tested in the same manner, gave peel strengths of 2 pounds per inch or less.

It is believed that the advantages and improved results of the method of the invention will be apparent from the foregoing detailed description of a preferred embodiment of the invention. It will be apparent that various modifications and changes may be made without departing from the spirit and scope of the invention as sought to be defined in the following claims.

What is claimed is:

1. An improved method of metallizing a polysulfone body comprising the steps of:

(a) treating said polysulfone body in a first solvent for said polysulfone body for about 2 to about 60 seconds to partially dissolve the surface layer of said polysulfone body;

(b) treating said surface layer with a second solvent which is miscible with said first solvent but which is a nonsolvent for said polysulfone body for about 2 to about 60 seconds to deposit on said surface layer a mat of said dissolved polysulfone body;

(c) drying said matted surface to remove said solvents;

(d) acid conditioning the matted surface to etch said matted surface, thereby rendering the same water wettable;

(e) rinsing and thereafter treating said matted surface with an alkaline cleaning solution to remove traces of said acid;

(f) immersing the matted surface in dilute HCl acid solution to neutralize said surface thereby making it more susceptible to metalization; and (g) depositing a metal on said matted surface to form a metalized layer thereon.

2. A method according to claim 1 wherein said solvent treated polysulfone body is air dried for about 30 minutes.

3. A method according to claim 2 wherein said acid conditioning solution is composed of chromic and sulfuric acids and said polysulfone body is conditioned for about 15 minutes to 60 minutes at temperatures of from 150° F. to 190° F.

4. A method according to claim 3 wherein said acid conditioned polysulfone body is thoroughly rinsed and is treated in said alkaline cleaning solution for about 5 minutes at about 140° F.

5. A method according to claim 4 wherein said alkaline cleaning solution is a mixture of $Na_2CO_3$, $Na_3PO_4$ and NaOH in water.

References Cited

UNITED STATES PATENTS

| | | | |
|---|---|---|---|
| 3,135,622 | 6/1964 | Ranalli | 117—47 |
| 3,252,844 | 5/1966 | Hechelhammer | 204—30X |
| 3,467,540 | 9/1969 | Schick | 117—213 |
| 3,471,376 | 10/1969 | Saubestre | 117—47 |

MURRAY KATZ, Primary Examiner

U.S. Cl. X.R.

117—63, 138.8, 213; 204—30